(12) United States Patent
Dhoolia et al.

(10) Patent No.: US 8,676,826 B2
(45) Date of Patent: Mar. 18, 2014

(54) METHOD, SYSTEM AND PROGRAM STORAGE DEVICE FOR AUTOMATIC INCREMENTAL LEARNING OF PROGRAMMING LANGUAGE GRAMMAR

(75) Inventors: Pankaj Dhoolia, Dadri (IN); Mangala G. Nanda, New Delhi (IN); Krishna Nandivada Venkata, Bangalore (IN); Diptikalyan Saha, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 168 days.

(21) Appl. No.: 13/170,723

(22) Filed: Jun. 28, 2011

(65) Prior Publication Data

US 2013/0006609 A1  Jan. 3, 2013

(51) Int. Cl.
*G06F 17/30* (2006.01)
*G06N 5/02* (2006.01)
*G06F 9/45* (2006.01)

(52) U.S. Cl.
USPC .............................. 707/760; 706/47; 717/143

(58) Field of Classification Search
USPC .............................. 706/47; 707/760; 717/143
See application file for complete search history.

(56) References Cited

U.S. PATENT DOCUMENTS

| | | | |
|---|---|---|---|
| 6,792,576 B1 | 9/2004 | Chidlovskii | |
| 6,990,442 B1 * | 1/2006 | Davis | 704/9 |
| 7,143,036 B2 * | 11/2006 | Weise | 704/245 |
| 7,266,491 B2 | 9/2007 | Humphreys et al. | |
| 7,406,685 B2 | 7/2008 | Fleehart et al. | |
| 7,987,458 B2 | 7/2011 | Rothman et al. | |
| 8,397,157 B2 * | 3/2013 | Levy | 715/234 |
| 2003/0144978 A1 | 7/2003 | Zeine | |
| 2004/0199374 A1 | 10/2004 | Wang et al. | |
| 2004/0225999 A1 * | 11/2004 | Nuss | 717/114 |
| 2005/0102131 A1 * | 5/2005 | Trower et al. | 704/4 |
| 2005/0187753 A1 | 8/2005 | Salter | |
| 2008/0281580 A1 | 11/2008 | Zabokritski | |
| 2009/0313613 A1 * | 12/2009 | Ben-Artzi et al. | 717/137 |
| 2010/0146492 A1 * | 6/2010 | Shacham et al. | 717/137 |
| 2010/0268979 A1 * | 10/2010 | Johnson | 714/2 |
| 2010/0306285 A1 * | 12/2010 | Shah et al. | 707/803 |
| 2012/0167065 A1 | 6/2012 | Urakhchin | |

OTHER PUBLICATIONS

U.S. Appl. No. 13/170,888, filed Jun. 28, 2011, Notice of Allowance Communication, Feb. 6, 2013, 8 pages.
Javed et al., "Incrementally Inferring Context-Free Grammars for Domain-Specific Languages," ACM, SEKE, 2006, pp. 363-368.

(Continued)

*Primary Examiner* — Jorge A Casanova
(74) *Attorney, Agent, or Firm* — Gibb & Riley, LLC

(57) ABSTRACT

The embodiments provide for automatic incremental learning of programming language grammar. A corpus (i.e., a text file of software code written in a particular programming language) is parsed based on a set of grammar rules. An unparsed statement from the corpus is identified along with a section thereof, which did not match any of the grammar rules in the set. A subset of the set of grammar rules at fault for the parsing failure is identified. Groups of new grammar rules are developed such that each group comprises at least one new grammar rule, such that each group can parse the unparsed statement, and such that each new grammar rule is a modification of grammar rule(s) in the subset. One specific group can then be selected for possible incorporation into the set of grammar rules. Optionally, before a specific group is selected, the groups can be heuristically pruned and/or ranked.

25 Claims, 10 Drawing Sheets

(56) References Cited

OTHER PUBLICATIONS

Crepinsek et al., "On Automata and Language Based Grammar Metrics," Advances in Languages, Related Technologies and Applications, ComSIS vol. 7, No. 2, Apr. 2010.

Mernik et al., "Grammar Inference Algorithms and Applications in Software Engineering," IEEE, 2009.

Dubey et al., "A Deterministic Technique for Extracting Keyword Based Grammar Rules from Programs," ACM, 2006, pp. 1631-1632.

Luk et al., "Automatic Grammar Partitioning for Syntactic Parsing," Prcoeedings of the Seventh International Workshop on Parsing Technologies (IWPT), Oct. 2001, Beijing, China, Tsinghua University Press, ISBN 7-302-04925-4, 11 pages.

Jourdan et al., "Techniques for Improving Grammar Flow Analysis," Lecture Notes in Computer Science, 1990, vol. 432/1990, pp. 240-255.

Saha et al., "Gramin: A System for Incremental Learning of Programming Language Grammars," ISEC, India, Feb. 2011.

Katsuhiko Nakamura, "Extending Incremental Learning of Context Free Grammars in Synapse," ICGI, pp. 281-282, 2004.

Nakamura et al., "Incremental Learning of Context Free Grammars Based on Bottom-Up Parsing and Search," Pattern Recognition, 38(9): pp. 1384-1392, 2005.

Alpena Dubey, "Goodness Criteria for Programming Language Grammar Rules," SIGPLAN Notices, 41(12): pp. 44-53, 2006.

Katsuhiko Nakamura, "Incremental Learning of Context Free Grammars by Bridging Rule Generation and Search for Semi Optimum Rule Sets," ICGI, pp. 72-83, 2006.

Dubey et al., "Inferring Grammar Rules of Programming Language Dialects," ICGI, pp. 201-213, 2006.

Dubey et al. "Learning Context-Free Grammar Rules From a Set of Program," IET Software, 2(3): pp. 223-240, 2008.

Imada et al., "Towards Machine Learning of Grammars and Compilers of Programming Languages," ECML PKDD'08: Proceedings of the European Conference on Machine Learning and Knowledge Discovery in Databases—Par II, pp. 98-112, Berlin, Heidelberg, 2008.

U.S. Appl. No. 13/170,888, filed Jun. 28, 2011, Office Action Communication, Oct. 19, 2012, 22 pages.

* cited by examiner

```
sort_statement→A end_of_statement
A→sort sort_clause
sort_clause→itab B
sort_clause→identifier
B→sort_option C
B→ASCENDING
B→DESCENDING
B→STABLE
B→by E
C→>by E
E→sort_by_item E
E→sort_by_item_field modifier
E→identifier sort_by_item→sort_by_item_field modifier
sort_by_item→identifier
modifier→DESCENDING
modifier→ASCENDING
sort_option→DESCENDING
sort_option→ASCENDING
sort_option→STABLE
sort_by_item_field >identifier
itab→identifier
end_of_statement→DOT
by→BY
sort→SORT
identifier→IDENTIFIER
```

FIG. 6

$$\frac{\text{token}(i,a)}{d(A,i,j)} \quad A \rightarrow a, \quad j=i+1$$

$$\frac{d(B,i,k), \ d(C,k,j)}{d(A,i,j)} \quad A \rightarrow BC$$

FIG. 7

```
1   Algorithm: FOCUS
2   Input: A: Nonterminal. 1, K: Token Index
3   Output: A set of
4        (N: Nonterminal. I',K': Token Index)
5   Ret={}
6
7
8   case 1.
9   if ∃d(A,I',K'), s.t. I<I'∧K'<K
10       return {(A,I,K)}
11  case 2
12  if ∃A→BC∈ G
13       case 2.I:
14           ∀J ∃d(B,I,J)s.t. I≤J<K
15    && ∃d(C,J+P,K) s.t. J+P≤K
16         P_min = min P s.t. ∃d(C,J+P,K)
17         if P_min = 0
18             Ret=[]
19         else
20             Ret=FocusW(B,I,J+Pmin)∪FocusW(C,J,K)
21  case 2.II:
22       if ∃d(B,I,J_max)
23       s.t. ∀J > J_max,∄d(B,I,J)
24       && Ad(C, J_max + P, K)
25           if ∄d(A,I,J_max)
26               Ret=FocusW(C,J_max,K)∪FocusW(B,I,K)
27           else
28               Ret=FocusW(C,J_max,K)
29  case 2.III:
30       if ∃d(C,J_min,K)
31       s.t. ∀J<J_min,∄d(C,J,K)
32       && ∄d(B,I,J')
33           if ∃d(A,J_min,K)
34               Ret=FocusW(B,I,J_min)∪FocusW(C,I,K)
35           else
36               Ret=FocusW(B,I,J_min)
37  return Ret
38
39  FocusW (A:Nonterminal/Terminal, I:Index, J:Index)
40       if (!terminal(A))
41           return {}
42       Ret=Focus(A,I,J)
43       if Ret={}
44           return {(A,I,J)}
45       else
46           return Ret
```

FIG. 8

```
focus(sort_staement,0,7)        case 2.III
focus(A,0,6)                    case 2.II
focus(sort_clause,1,6)          case 2.I
focus(itab,1,4)
      focus(B,2,6)              case 2.II
                                focus(C,2,6)
      focus(sort_option,2,4)
| SORT | t1  |  [  |  ]  | BY  | f1  |       |
0      1     2     3     4     5     6       7
                                B     DOT
  sort   IDENTIFIER             C            end_of_statement
         identifier    RBRACKET  by    E
         itab                       sort_by_item
                                    sort_by_item_field
                   LBRACKET                IDENTIFIER
```

FIG. 9

```
 1  case 2.I:
 2    if ∃d(B,I,J) s.t. I≤J<K
 3       && ∃d(C,J+P,K) s.t. J+P≤K
 4    P_min=min P s.t. ∃d(C,J+P,K)
 5    if P==0
 6        Ret={}
 7    else
 8        if(prop(B,_,V) && prop(C,F,_) &&
 9           k ∉ token[J..J + P_min]
10             where k=start_kw(c))
11          Ret=focusW(B,I,J+P_min)
12        else if (prop(B,_,f) && prop(C,v,_) &&
13           k ∉ token[J..J + P_min]
14             where k=end_kw(B))
15          Ret=focusW (C,J,K)
16        else
17             Ret=FocusW(B,I,J+P_min) ∪FocusW(C,J,K)
```

FIG. 10

$$\frac{}{i\xrightarrow{A}T, \to A\to\beta\gamma} d(\beta,i,j), d(\gamma,j,k) \quad (1)$$

$$\frac{A\to Q, \quad i\xrightarrow{Q}k}{i\xrightarrow{A}k} \quad (2)$$

$$\frac{A\to QR, \quad i\xrightarrow{Q}j}{i\xrightarrow{A}k} d(R,j,k) \quad (3)$$

$$\frac{A\to QR, \quad j\xrightarrow{R}k}{i\xrightarrow{A}k} d(Q,i,j) \quad (4)$$

$$\frac{i\xrightarrow{Q}j}{i\xrightarrow{A}k, \quad A\to QR} d(R,j,k) \quad (5)$$

$$\frac{j\xrightarrow{R}k}{i\xrightarrow{A}k, \quad A\to QR} d(Q,i,j) \quad (6)$$

$$\frac{A\to QR, \quad i\xrightarrow{Q}j, \quad j\xrightarrow{R}k}{i\xrightarrow{A}k} \quad (7)$$

$$\frac{i\xrightarrow{Q}j, \quad j\xrightarrow{R}k}{i\xrightarrow{A}k, \quad A\to QR} \quad (8)$$

FIG. 11

METHOD, SYSTEM AND PROGRAM STORAGE DEVICE FOR AUTOMATIC INCREMENTAL LEARNING OF PROGRAMMING LANGUAGE GRAMMAR

BACKGROUND

1. Field of the Invention

The embodiments related to programming language grammar and, more particularly, to a computer-implemented method, a system and an associated program storage device for automatic incremental learning of programming language grammar.

2. Description of the Related Art

Software code is typically written in a programming language (e.g., Basic, C, C++, structured query language (SQL), etc.) and stored (e.g., in a text file). However, to execute the software code it must first be converted into a machine-readable format. To accomplish this, a parser (i.e., a syntactic analyzer) can parse the software code based on the grammar of the particular programming language. Specifically, a parsing program, generated based on a set of grammar rules which define the syntactic structure of all strings in that particular programming language, can parse the software code into a parse tree. Then, a complier can convert (i.e., translate) the parse tree into computer-executable code.

Oftentimes, however, the grammar for the particular programming language (i.e., the set of grammar rules) may be incomplete due to evolution of the programming language (i.e., changes in the programming language over time). As a result, parsing of the software code may fail. Unfortunately, manually updating the grammar can be a time-consuming and error-prone task. Thus, there is a need for a computer-implemented method, a system and an associated program storage device for automatic incremental learning of programming language grammar.

SUMMARY

In view of the foregoing, disclosed herein are embodiments of a computer-implemented method for automatic incremental learning of programming language grammar. In the method, a corpus (e.g., a text file of software code) that is written in a particular programming language can be parsed based on a set of grammar rules for that particular programming language. Next, an unparsed statement from the corpus can be identified along with a section thereof, which did not match any of the grammar rules in the set of grammar rules. Then, a subset of the set of grammar rules at fault for the parsing failure can be identified. Once the subset of grammar rules at fault for the parsing failure are identified, groups of new grammar rules can be developed such that each group comprises at least one new grammar rule, such that each group is further capable of parsing that statement with that section, and such that each new grammar rule is a modification of at least one grammar rule in the subset. Once the groups of new grammar rules are developed, one specific group can be selected for possible incorporation into the set of grammar rules in order to produce a new set of grammar rules. Optionally, before a specific group is selected, the groups of new grammar rules can be heuristically pruned and/or ranked in order to ensure that the best group is selected. Also disclosed are embodiments of an associated system and program storage device.

Specifically, disclosed herein are embodiments of a computer-implemented method for automatic incremental learning of programming language grammar. In the method embodiments, a corpus (e.g., a text file of software code) that is written in a particular programming language can be parsed. The parsing process can be performed based on a set of grammar rules for that particular programming language. Then, if the parsing process fails, the results can be analyzed in order to identify (e.g., based on a set of grammar heuristics) a statement in the corpus that was not parsed, a section of the statement that did not match any of the grammar rules in the set of grammar rules such that the statement could not be parsed, and a subset of the set of grammar rules at fault for the parsing failure. Next, groups of new grammar rules are developed such that each group comprises at least one new grammar rule, such that each group is capable of parsing the statement having the section and such that each new grammar rule comprises a modification of at least one grammar rule in the subset. After the groups of new grammar rules are developed, one group can be selected for possible incorporation into the set of grammar rules to produce a new set of grammar rules.

Optionally, before a group of new grammar rules is selected, the groups of new grammar rules can be heuristically pruned and/or ranked in order to ensure that the best group of new grammar rules is selected. For example, after the groups of new grammar rules are developed, at least some of the groups of new grammar rules can be discarded (i.e., removed from further consideration) based on a set of pruning heuristics that are based, for example, on the occurrence of a non-matching parenthesis within any new grammar rules, on recursion form of any new grammar rules, and/or on subset configuration. Additionally or alternatively, any remaining groups of new grammar rules can be ranked based on a set of ranking heuristics that are based, for example, on the total number of new grammar rules in each group, the number of non-terminals within the new grammar rules of each group, the sizes of right-hand sides of the new grammar rules in each group, the inclusion of recursive constructs in the new grammar rules in each group and/or coverage of other statements by the new grammar rules of each group.

Also disclosed herein are embodiments of a system for automatic incremental learning of programming language grammar. The system embodiments can comprise at least one memory device storing a corpus (e.g., a text file of software code), which is written in a particular programming language, and at least one processor in communication with the memory device. The processor can comprise at least a parser, a grammar rule analyzer, a new grammar rule sets generator and a new grammar rule set selector. The parser can parse the corpus based on a set of grammar rules for the particular programming language. The grammar rule analyzer can analyze the results of the parsing process in order to identify (e.g., based on a set of grammar heuristics) a statement in the corpus that was not parsed by the parser, a section of the statement that did not match any of the grammar rules in the set of grammar rules such that the statement could not be parsed, and a subset of the set of grammar rules at fault for the parsing failure. The new grammar rules generator can develop groups of new grammar rules such that each group comprises at least one new grammar rule, such that each group is capable of parsing the statement having the section, and such that each new grammar rule is a modification of at least one grammar rule in the subset. After the groups of new grammar rules are developed, the new grammar rule selector can select one of the groups of new grammar rules for possible incorporation into the set of grammar rules to produce a new set of grammar rules.

Optionally, at least one processor can further comprise a new grammar rules pruner and/or a grammar rules ranking generator that can heuristically prune and/or rank, respectively, the groups of new grammar rules in order to ensure that the best group of new grammar rules is selected. For example, after the groups of new grammar rules are developed, the new grammar rules pruner can discard (i.e., remove from further consideration) at least some of the groups of new grammar rules based on a set of pruning heuristics. The set of pruning heuristics can be based, for example, on the occurrence of a non-matching parenthesis within any new grammar rules, on recursion form of any new grammar rules, and/or on subset configuration. Additionally or alternatively, the grammar rules ranking generator can rank any remaining groups of new grammar rules based on a set of ranking heuristics. The set of ranking heuristics can, for example, be based on the total number of new grammar rules in each group, the number of a non-terminals within the new grammar rules in each group, the sizes of the right-hand sides of the new grammar rules in each group, inclusion of recursive constructs in the new grammar rules in each group and/or coverage of other statements by the new grammar rules in each group.

Also disclosed herein are embodiments of a program storage device readable by a computer and tangibly embodying a program of instructions executable by the computer to perform the above described method for automatic incremental learning of programming language grammar.

BRIEF DESCRIPTION OF THE SEVERAL VIEWS OF THE DRAWINGS

The embodiments disclosed herein will be better understood from the following detailed description with reference to the drawings, which are not necessarily drawn to scale and in which:

FIG. 6 is a table illustrating an exemplary SORT statement written ABAP language and encoded in Chomsky Normal Form (CNF) format;

FIG. 7 is a table illustrating exemplary Cocke-Younger-Kasami (CYK) parsing rules;

FIG. 8 illustrates an exemplary algorithm that can be use to implement the disclosed embodiments;

FIG. 9 is a graph illustrating application of the algorithm of FIG. 8;

FIG. 10 illustrates an exemplary modification that can be made to the algorithm of FIG. 8; and FIG. 11 illustrates exemplary bridging rules 1-8 that can be applied within the framework of FIG. 5.

DETAILED DESCRIPTION

Figure 1:
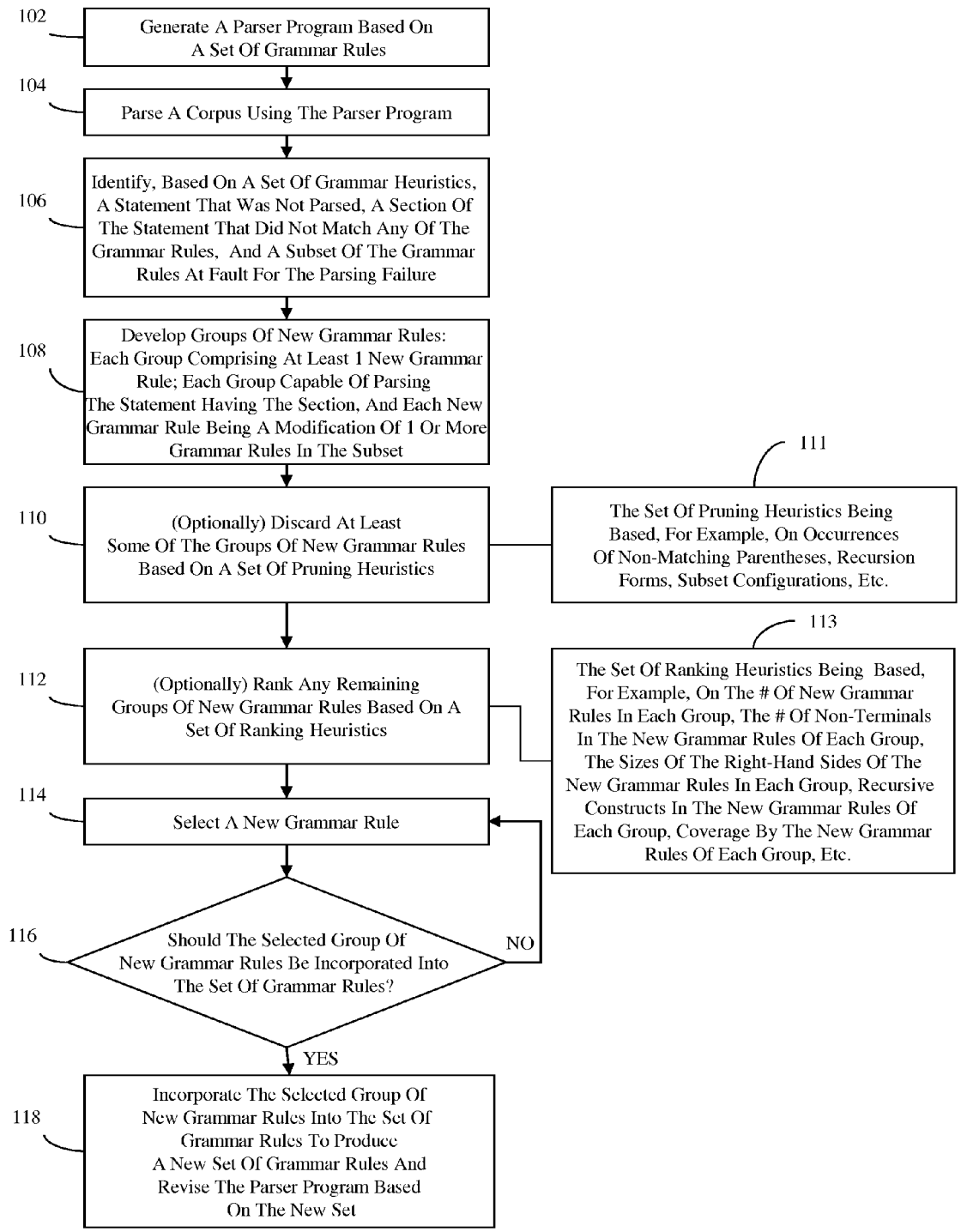
FIG. 1 is a flow diagram illustrating a method embodiment for automatic incremental learning of programming language grammar.

The disclosed embodiments and the various features and advantageous details thereof are explained more fully with reference to the following detailed description and the accompanying drawings.

As mentioned above, software code is typically written in a programming language (e.g., Basic, C, C++, structured query language (SQL), etc.) and stored (e.g., in a text file). However, to execute the software code it must first be converted into a machine-readable format. To accomplish this, a parser (i.e., a syntactic analyzer) can parse the software code based on the grammar of the particular programming language. Specifically, a parsing program, generated based on a set of grammar rules which define the syntactic structure of all strings in that particular programming language, can parse the software code into a parse tree. Then, a complier can convert (i.e., translate) the parse tree into computer-executable code.

Software code is typically written in a programming language (e.g., Basic, C, C++, structured query language (SQL), etc.) and stored (e.g., in a text file). However, to execute the software code it must first be converted into a machine-readable format. To accomplish this, a parser (i.e., a syntactic analyzer) can parse the software code based on the grammar of the particular programming language. Specifically, a parsing program, generated based on a set of grammar rules which define the syntactic structure of all strings in that particular programming language, can parse the software code into a parse tree. Then, a complier can convert (i.e., translate) the parse tree into computer-executable code.

Oftentimes, however, the grammar for the particular programming language (i.e., the set of grammar rules) may be incomplete due to evolution of the programming language (i.e., changes in the programming language over time). As a result, parsing of the software code may fail. Unfortunately, manually updating the grammar can be a time-consuming and error-prone task. Thus, there is a need for a computer-implemented method, a system and an associated program storage device for automatic incremental learning of programming language grammar.

In view of the foregoing, disclosed herein are embodiments of a computer-implemented method for automatic incremental learning of programming language grammar. In the method, a corpus (e.g., a text file of software code) that is written in a particular programming language can be parsed based on a set of grammar rules for that particular programming language. Next, an unparsed statement within the corpus can be identified along with a section thereof, which did not match any of the grammar rules in the set of grammar rules. Then, a subset of the set of grammar rules at fault for the parsing failure can be identified. Once the subset of grammar rules at fault for the parsing failure are identified, groups of new grammar rules can be developed such that each group comprises at least one new grammar rule, such that each group is capable of parsing that statement with that section, and such that each new grammar rule is a modification of at least one of the grammar rule in the subset. Once the groups of new grammar rules are developed, one group can be selected for possible incorporation into the set of grammar rules in order to produce a new set of grammar rules. Optionally, before a group of new grammar rules is selected, the groups of new grammar rules can be heuristically pruned and/or ranked in order to ensure that the best group of new grammar rule is selected. Also disclosed are embodiments of an associated system and program storage device.

Specifically, referring to FIG. 1, disclosed herein are embodiments of a computer-implemented method for automatic incremental learning of programming language grammar. In the method embodiments, a parser program can be generated (e.g., by a parser generator) based on a set of grammar rules for a particular programming language (102). As mentioned above, the set of grammar rules defines the syntactic structure of the strings in the programming language. The parsing program as generated can be a program that, when executed by a computer, can parse software code written in the programming language into a parse tree for subsequent conversion into computer-executable code by a compiler. Processes for generating parser programs are well-known in the art and, thus, the details of parser program generation are omitted from this specification in order to allow the reader to focus on the salient aspects of the disclosed embodiments.

Next, a corpus (e.g., a text file of software code for on or more programs is stored in memory) that is written in a particular programming language can be parsed (104). That is, the parsing program can be executed so that the corpus is parsed based on a set of grammar rules for that particular programming language. Then, if the parsing process 104 fails, the results can be analyzed (e.g., by a computer-implemented grammar rule analyzer (also referred to herein as a "focuser") based on a set of grammar heuristics stored in memory) in order to identify a statement in the corpus that was not parsed, a section of the statement that did not match any of the grammar rules in the set of grammar rules such that the statement could not be parsed, and a subset of the set of grammar rules at fault for the parsing failure (106). Identifying the subset of the set of grammar rules at fault for the parsing failure reduces the seed set that will subsequently be used to generate new grammar rules that will allow the required parsing to be performed.

Next, groups of new grammar rules can be developed (e.g., by a computer-implemented new grammar rules generator, also referred to herein as a "focuser", and based on a stored set of rules for generating groups of new grammar rules) (108). Specifically, the groups of new grammar rules can be developed such that each group is capable of parsing the statement having the unparsed section and such that each new grammar rule is a modification of at least one grammar rule in the previously identified subset (108). For example, the section of the statement that failed to parse may contain the non-terminal "If" followed by the expression (i.e., the condition) "A≠B". One of the grammar rules in the subset may similarly have the non-terminal (e.g., "if") such that it should be able to parse the statement, but instead of being followed by the expression "A≠B" it is followed by the expression "A=B". In this case, instead of generating an entirely new grammar rule, a new grammar rule can be created by modifying the original grammar rule so that it now also includes the expression "A≠B". That is, the original grammar rule is simply augmented by adding the expression "A≠B" to it. In this manner, any grammar rule in the set of grammar rules should be modified to generate a new grammar rule, when that grammar rule alone and/or in combination with other grammar rules could have parsed the statement but-for some sub-string (such as "A≠B" in the above-example) that was contained therein and that was not accounted for in the grammar rule. Those skilled in the art will recognize that typically multiple grammar rules are required to parse a statement or portion thereof. Thus, the groups developed at process 108 may comprise a single new grammar rule, but will typically comprise multiple new grammar rules.

After the groups of new grammar rules are developed at process 108, one of the groups of new grammar rules can be selected for possible incorporation into the set of grammar rules to produce a new set of grammar rules (114).

However, optionally, before a group of new grammar rules is selected at process 114, the groups of new grammar rules developed at process 108 can be heuristically pruned (110) and/or ranked (112) in order to ensure that the best groups of new grammar rules is selected.

Specifically, after the groups of new grammar rules are developed at process 114, at least some of the groups of new grammar rules can be automatically discarded (i.e., automatically removed from further consideration) (e.g., by a computer-implemented new grammar rules pruner based on a set of pruning heuristics stored in memory) (110-111). These pruning heuristics can be at the rule-level (e.g., based on rule dependency structure, rule type, left-hand side exclusions, etc.) or at the grammar level (e.g., based on the occurrence of a non-matching parenthesis in any new grammar rules in each group, on recursion form of any new grammar rules in each group, on subset configuration, etc.) to ensure that only groups of new grammar rules meeting pre-established a "goodness" criteria are considered.

Additionally or alternatively, any remaining groups of new grammar rules can be ranked (e.g., by a computer-implemented new grammar rules ranker based on a set of ranking heuristics) (112-113). These ranking heuristics can be based, for example, on the total number of new grammar rules in each group, the number of non-terminals within the new grammar rule in each group, the sizes of the right-hand sides of the new grammar rules in each group, inclusion of recursive constructs in the new grammar rules of each group, coverage of other statements by the new grammar rules of each group, etc. to rank the groups of new grammar rules and, if applicable, to rank those remaining groups of new grammar rules, following pruning, that meet the pre-established "goodness" criteria according to which best meet the "goodness" criteria.

As mentioned above, after the groups of new grammar rules are developed at process 108 and, optionally, pruned and/or ranked at process 112-113, one of the groups of new grammar rules can be selected from amongst all of the developed groups of new grammar rules or from amongst the remaining groups of new grammar rules after pruning, if applicable, for possible incorporation into the set of grammar rules to produce a new set of grammar rules (114). Once a group of new grammar rules is selected at process 114, a determination can be made as to whether or not the selected group of new grammar rules should be incorporated into the set of grammar rules (116). The processes 114-116 can be iteratively repeated until the best group of new grammar rules (e.g., the group of new grammar rules that will provide the greatest amount of parsing coverage) is selected.

For example, at process 114, a group of new grammar rules can be selected. This group of new grammar rules can be the highest ranked grammar as determined at process 112, if applicable. Then, to determine if the selected group of new grammar rule should or shouldn't be incorporated into the set of grammar rules at process 116, the selected group of new grammar rules can be further evaluated for coverage (i.e., to determine whether it broadly covers other identified parsing failures).

Figure 2:
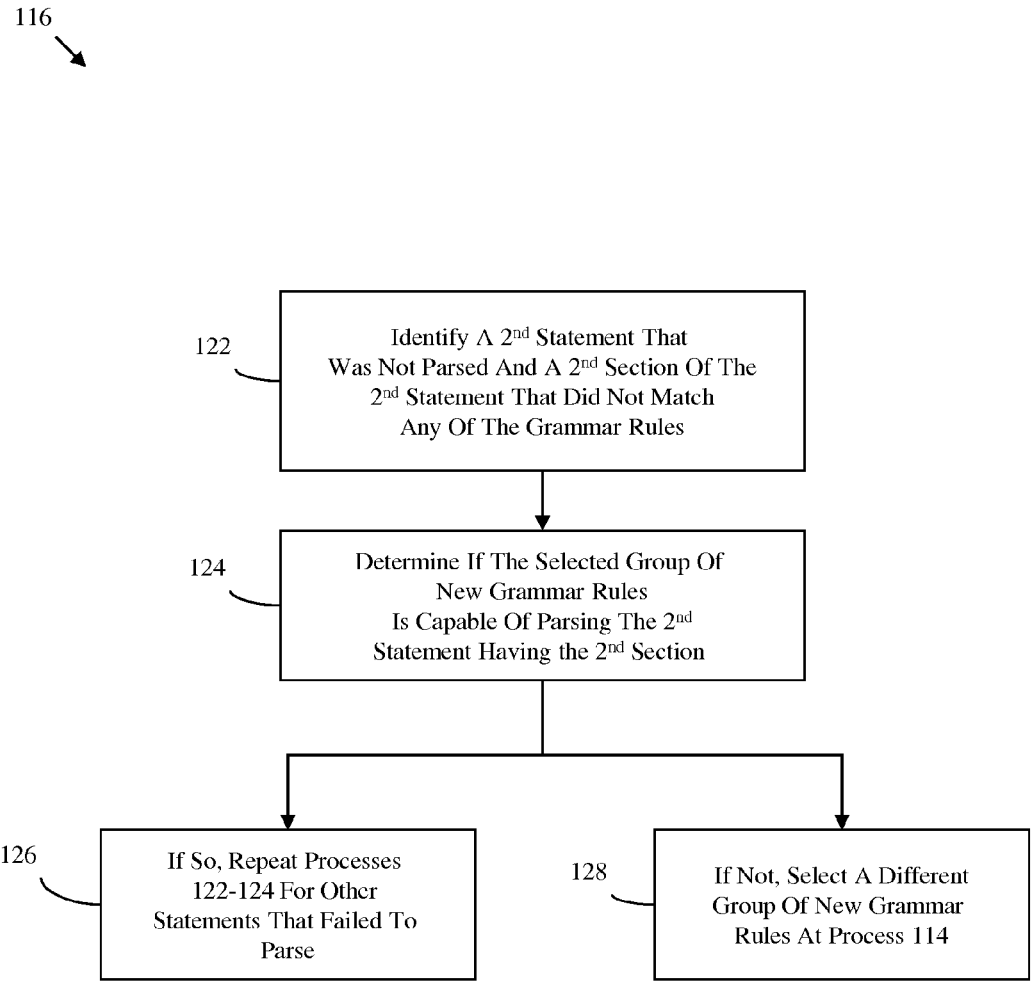
FIG. 2 is another flow diagram further illustrating a process step within the method of FIG. 1.

Specifically, referring to FIG. 2, the parsing results can be analyzed (e.g., by the computer-implemented grammar rule analyzer based on the set of grammar heuristics stored in memory) in order to identify a second statement in the corpus that was not parsed and a second section of the second statement that did not match any of the grammar rules in the set of grammar rules (122). It should be understood that the second statement and second section thereof identified at process 122 can be either the same statement (as previously identified at process 106) and a different section thereof or a completely new statement and section thereof. Next, a determination can be made as to whether or not the group of new grammar rules selected at process 116 is capable of parsing (i.e., can be used in a parser program to parse) the second statement having the second section (124). When the selected group of new grammar rules is capable of parsing the second statement having the second section, then the processes 122-124 are repeated for other statements that failed to parse (126). However, when the selected group of new grammar rules is not capable of parsing the second statement having the second section, then process 114 is repeated (128). Specifically, a different one of the groups of new grammar rules (e.g., the next highest rated) is selected for possible incorporation into the set of grammar rules to produce the new set of grammar rule and then process 116 is repeated and a determination is made as to whether this different group of new grammar rules (i.e., the next selected group of new grammar rules) is capable of parsing the second statement.

Once a group of new grammar rules is finally selected using this iterative process, it can be incorporated into the set of grammar rules to produce a new set of grammar rules and the parser program can be revised (i.e., updated) based on the new set of grammar rules (118). The iterative process described above allows groups of new grammar rules with the greatest possible coverage for parsing to be selected for incorporation into the set of grammar rules and, thereby, limits the total number of new grammar rules required to update the parser program.

Figure 3:
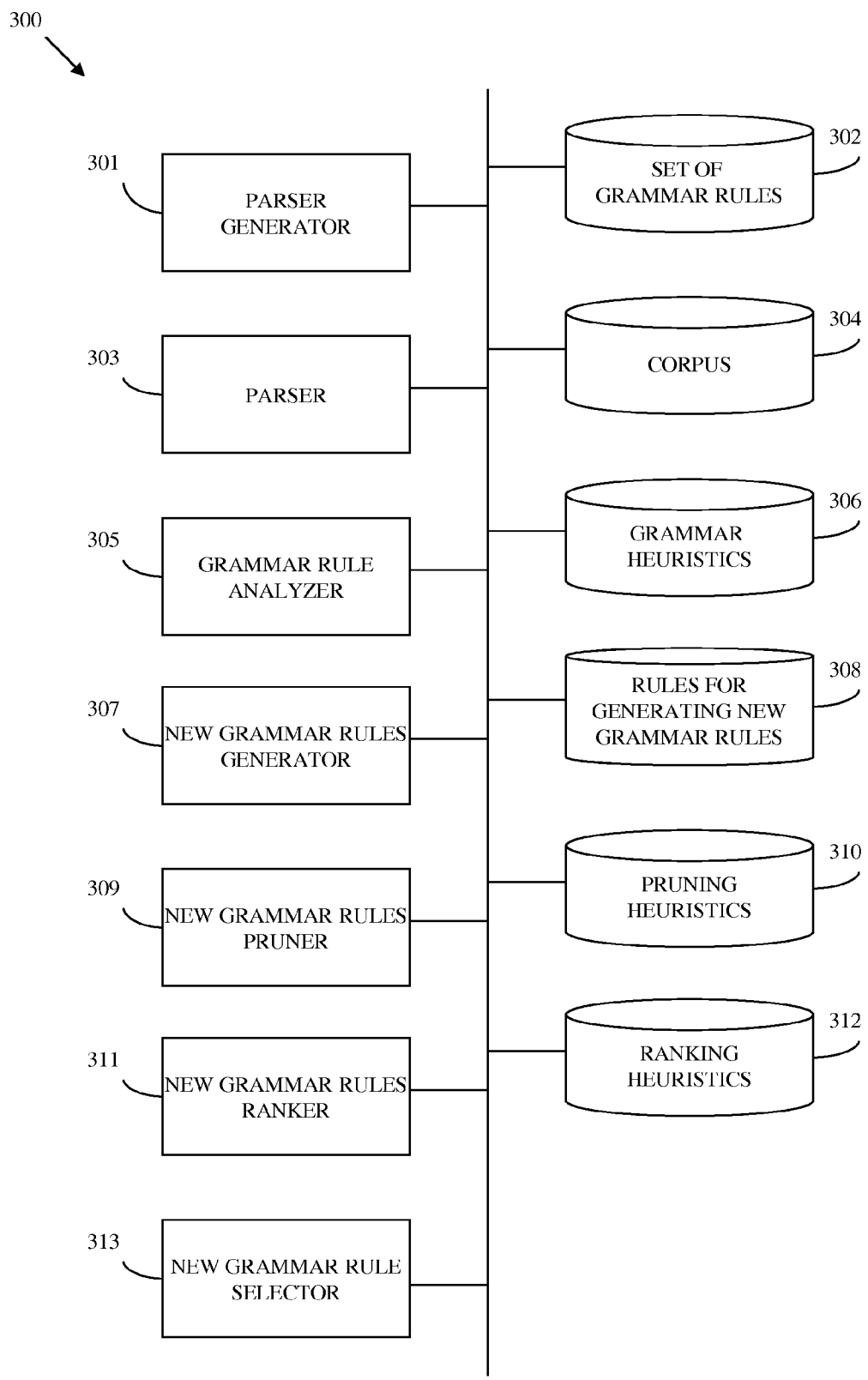
FIG. 3 is a schematic diagram illustrating a system embodiment for automatic incremental learning of programming language grammar.

Referring to FIG. 3, also disclosed herein are embodiments of a system 300 for automatic incremental learning of programming language grammar. The system 300 can be implemented, for example, in a computer hardware environment such as that described in detail below and depicted in FIG. 4. Specifically, the system 300 embodiments can comprise at least one memory device and at least one computer processing unit (i.e., processors) in communication with the memory device(s).

The memory device(s) (see FIG. 4 and detailed discussion below) can store at least a set of grammar rules for a particular programming language 302, a corpus 304 (e.g., a text file of software code for at least one program that is written in the particular programming language), a set of grammar heuristics 306, and a set of rules for generating new grammar rules 308. Additionally, the processor(s) (see FIG. 4 and detail discussion below) can comprise at least a parser generator 301, a parser 303, a grammar rule analyzer 305, a new grammar rules generator 307 and a new grammar rule selector 313.

The parser generator 301 can generate (i.e., can be adapted to generate, can be configured to generate, can be programmed to generate, etc.) a parser program based on the stored set of grammar rules 302. As mentioned above, the set of grammar rules defines the syntactic structure of the strings in the programming language. The parsing program as generated can be a program that, when executed by a computer, can parse software code written in the programming language into a parse tree for subsequent conversion into computer-executable code by a compiler. Parser generators for generating parser programs are well-known in the art and, thus, the details of such parser generators are omitted from this specification in order to allow the reader to focus on the salient aspects of the disclosed embodiments.

The parser 303 can execute (i.e., can be adapted to execute, can be configured to execute, etc.) the parser program in order to parse the stored corpus 304. That is, the parsing program can be executed by the parser 303 so that the corpus 304 is parsed based on the set of grammar rules 302 for that particular programming language.

The grammar rule analyzer 305 (also referred to herein as a "focuser") can analyze (i.e., can be adapted to analyze, can be configured to analyze, can be programmed to analyze, etc.) the parsing particularly when fails are detected. This analyzing processes can be based on the stored set of grammar heuristics 306 in order to identify a statement in the corpus 304 that was not parsed, a section of the statement that did not match any of the grammar rules in the set of grammar rules 302 such that the statement could not be parsed, and a subset of the set of grammar rules at fault for the parsing failure. Identifying the subset of the set of grammar rules at fault for the parsing failure reduces the seed set that will subsequently be used to generate new grammar rules that will allow the required parsing to be performed.

The new grammar rules generator 307 can develop (i.e., can be adapted to develop, can be configured to develop, can be programmed to develop, etc.) groups of new grammar rules. Specifically, these groups of new grammar rules can be developed by the new grammar rules generator 307 based on the stored set of rules for generating new rules 308 such that each group is cable of parsing the statement having the unparsed section and such that each new grammar rule is a modification of at least one grammar rule in the previously identified subset. For example, the section of the statement that failed to parse may contain the non-terminal "If" followed by the expression (i.e., the condition) "A≠B". One of the grammar rules in the subset may similarly have the non-terminal (e.g., "if") such that it should be able to parse the statement, but instead of being followed by the expression "A≠B" it is followed by the expression "A=B". In this case, instead of generating an entirely new grammar rule, a new grammar rule is created by modifying the original grammar rule so that it now also includes the expression "A≠B". That is, the original grammar rule is simply augmented by adding the expression "A≠B" to it. In this manner, any grammar rule in the set of grammar rules should be modified to generate a new grammar rule, when that grammar rule could have parsed the statement but-for some sub-string (such as "A≠B" in the above-example) that was contained therein and that was not accounted for in the grammar rule. Those skilled in the art will recognize that typically multiple grammar rules are required to parse a statement or portion thereof. Thus, the groups developed by generator 307 may comprise a single new grammar rule, but will typically comprise multiple new grammar rules.

The new grammar rule selector 313 can select (i.e., can be adapted to select, can be configured to select, can be programmed to select, etc.) one of the groups of new grammar for possible incorporation into the set of grammar rules to produce a new set of grammar rules.

Optionally, before a group of new grammar rule is selected by the new grammar rule selector 313, the groups of new grammar rules can be heuristically pruned (e.g., by a new grammar rules pruner) and/or ranked (e.g., by a new grammar rules ranker) in order to ensure that the best group of new grammar rules is selected.

Specifically, the memory device(s) can further store a set of pruning heuristics 310 and the processor(s) can further comprise a new grammar rules pruner 309. The new grammar rules pruner 309 can automatically discard (i.e., can be adapted to automatically discard, can be configured to automatically discard, can be programmed to automatically discard, etc.) at least some of the groups of new grammar rules developed by the new grammar rules generator 307 based on the stored set of pruning heuristics 310. That is, the new grammar rules pruner can automatically removed some of the groups of new grammar rules from further consideration based on the pruning heuristics 310. These pruning heuristics 310 can be at the rule-level (e.g., based on rule dependency structure, rule type, left-hand side exclusions, etc.) or at the grammar level (e.g., based on the occurrence of a non-matching parenthesis in any new grammar rules of each group, on recursion form of any new grammar rules of each group, on subset configuration, etc.) to ensure that only groups of new grammar rules meeting pre-established a "goodness" criteria are considered.

Additionally or alternatively, the memory device(s) can further store a set of ranking heuristics 312 and the processor(s) can further comprise a new grammar rules ranker 311. The new grammar rules ranker 311 can rank (i.e., can be adapted to rank, can be configured to rank, can be programmed to rank, etc.) the groups of new grammar rules or, if applicable, any remaining groups of new grammar rules after pruning based on the stored set of ranking heuristics 312. These ranking heuristics 312 can be based, for example, on the total number of new grammar rules in each group, the number non-terminals within the new grammar rules of each group, the sizes of the right-hand sides of the new grammar rules in each group, inclusion of recursive constructs in the new grammar rules in each group, coverage of other statements by the new grammar rules of each group, etc. to rank all the groups of new grammar rules or to rank those remaining groups of new grammar rules that meet the pre-established "goodness" criteria according to which best meet the "goodness" criteria after pruning.

As mentioned above, the new grammar rule selector 313 can select one of the groups of new grammar rules from amongst all of the newly developed grammar rules or from amongst the remaining groups of new grammar rules after pruning, if applicable, for possible incorporation into the set of grammar rules to produce a new set of grammar rules. Once a group of new grammar rules is selected by the new grammar rule selector 313, the grammar rule analyzer 305 can further determine (i.e., can be adapted to determine, can be configured to determine, can be programmed to determine, etc.) whether or not the selected group of new grammar rules should be incorporated into the set of grammar rules. The selection process performed by the grammar rule selector 313 and the appropriateness determination performed by the grammar rule analyzer 305 are performed iteratively until the best group of new grammar rules (e.g., the group of new grammar rules that will provide the greatest amount of parsing coverage) is selected.

For example, the new grammar rule selector 313 can select a group of new grammar rules. This group of new grammar rules can be the highest ranked group as determined by the new grammar rules ranker 311, if applicable. Then, the grammar rule analyzer 305 can evaluate the selected group of new grammar rules for coverage (i.e., to determine whether it broadly covers other identified parsing failures).

Specifically, the grammar rule analyzer 305 can analyze the parsing results based on the stored set of grammar heuristics 306 in order to identify a second statement in the corpus 304 that was not parsed and a second section of the second statement that did not match any of the grammar rules in the set of grammar rules 302. It should be understood that the second statement and second section thereof identified at process 122 can be either the same statement and a different section thereof or a completely new statement and section thereof. The grammar rule analyzer 305 can further determine whether or not the selected group of new grammar rules is capable of parsing (i.e., can be used in a parser program to parse) the second statement having the second section. When the selected group of new grammar rules is capable of parsing the second statement having the second section, then the grammar rule analyzer 305 can repeat these processes for other statements that failed to parse. However, when the selected group of new grammar rules is not capable of parsing the second statement having the second section, then the new grammar rule selector 313 will select another group of new grammar rules. That is, the new grammar rule selector 313 will select a different one of the groups of new grammar rules (e.g., the next highest ranked group) for possible incorporation into the set of grammar rules to produce the new set of grammar rule and then the grammar rule analyzer 305 will again make an appropriateness determination. That is, the grammar rule analyzer 305 will determine whether the next selected group of new grammar rules is capable of parsing the second statement and so on.

Once a group of new grammar rules is finally selected by the new grammar rule selector 313 using this iterative process, the finally selected group can be incorporated into the set of grammar rules to produce a new set of grammar rules and the parser generator 301 can revise (i.e., can be adapted to revise, can be configured to revise, can be programmed to revise, etc.) the parser program based on the new set of grammar rules. The iterative process described above allows groups of new grammar rules with the greatest possible coverage for parsing to be selected for incorporation into the set of grammar rules and, thereby, limits the number of new grammar rules required to update the parser program.

As described above and illustrated in FIG. 3, the components (e.g., parser generator 301, parser 303, grammar rule analyzer 305, grammar rules generator 307, grammar rules pruner 309, grammar rules ranker 311 and grammar rule selector 313) can be implemented by discrete units (e.g., discrete computer systems or discrete computer processing units (i.e., discrete processors). However, alternatively, any two or more of these components can be implemented by a single unit (e.g., by a single computer system or by a computer processing unit (i.e., a single processor)). Similarly, as described above and illustrated in FIG. 3, the stored information (e.g., set of grammar rules 302, corpus 304, grammar heuristics 306, new grammar rules heuristics 308, pruning heuristics 310, and ranking heuristics 312) can be stored by discrete memories. However, alternatively, any of this stored information can be stored on the same memory.

Also disclosed herein are embodiments of a program storage device that is readable by a computer and that tangibly embodies a program of instructions executable by the computer to perform the above described method for automatic incremental learning of programming language grammar. Specifically, as will be appreciated by one skilled in the art, aspects of the disclosed embodiments can not only be embodied as a system and method, as described above, but also as computer program product. Accordingly, aspects of the disclosed embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the disclosed embodiments may take the form of a computer program product embodied in at least one computer readable medium having computer readable program code embodied thereon.

Any combination of at least one computer readable medium may be utilized. The computer readable medium may be a non-transitory computer readable storage device or a computer readable signal medium. A non-transitory computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the non-transitory computer readable storage device would include the following: an electrical connection having at least one wire, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

As mentioned above, the computer readable medium can alternatively comprise a computer readable signal medium that includes a propagated data signal with computer readable program code embodied therein, for example, in baseband or as part of a carrier wave. Such a propagated signal may take any of a variety of forms, including, but not limited to, electromagnetic, optical, or any suitable combination thereof. This computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the disclosed embodiments may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the disclosed embodiments are described above with reference to flowchart illustrations and/or block diagrams of methods, apparatus (systems) and computer program products. It will be understood that each block of the flowchart illustrations and/or D-2 block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

Figure 4:
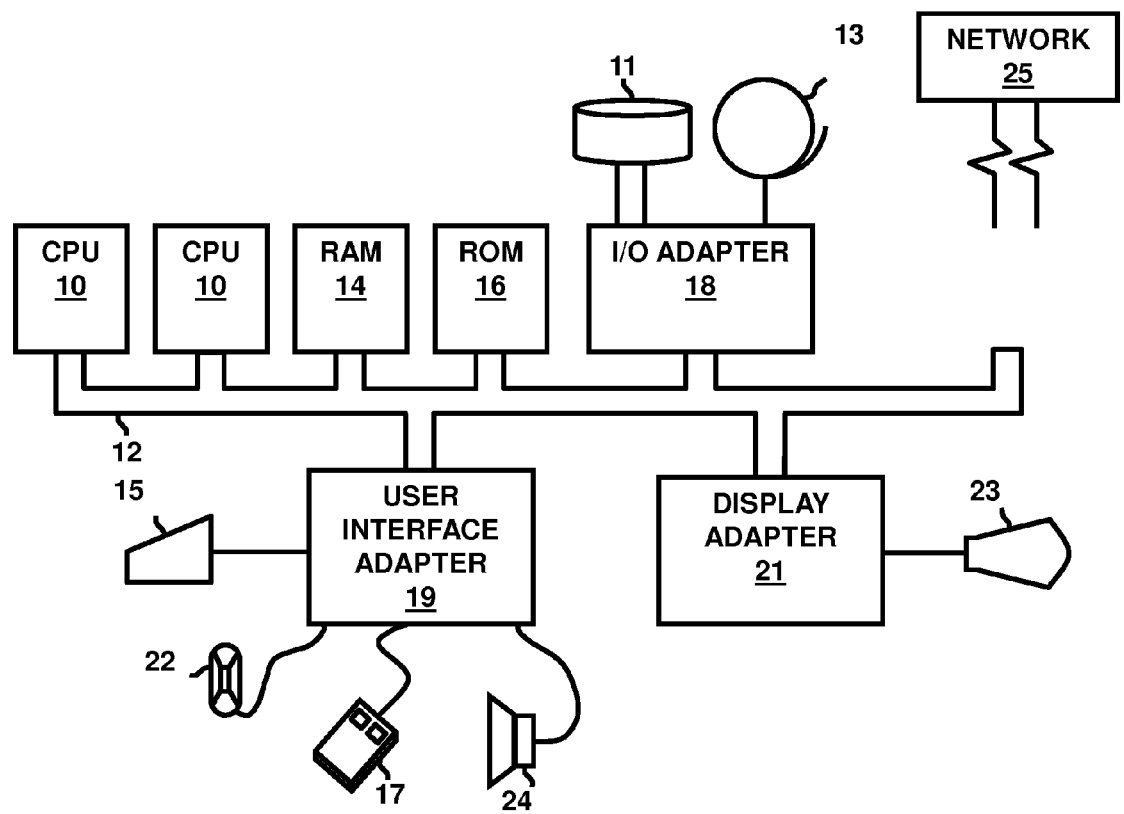
FIG. 4 is a schematic diagram illustrating an exemplary hardware environment that can be used to implement the disclosed embodiments.

As mentioned above, the representative hardware environment for practicing the disclosed method, system and program storage device embodiments is depicted in FIG. 4. This schematic drawing illustrates a hardware configuration of an information handling/computer system in accordance with the disclosed embodiments. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter 18. The I/O adapter 18 can connect to peripheral devices, such as disk units 11 and tape drives 13, or other program storage devices that are readable by the system. The system can read the inventive instructions on the program storage devices and follow these instructions to execute the methodology of the disclosed embodiments. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

It should be understood that the flowcharts and block diagrams in the Figures referenced above illustrate the architecture, functionality, and operation of the various possible implementations of the disclosed systems, methods and computer program products. In this regard, each block in the flowchart or block diagrams may represent a module, segment, or portion of code, which comprises at least one executable instruction for implementing the specified logical function(s). It should also be noted that, in some alternative implementations, the functions noted in any block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 5:
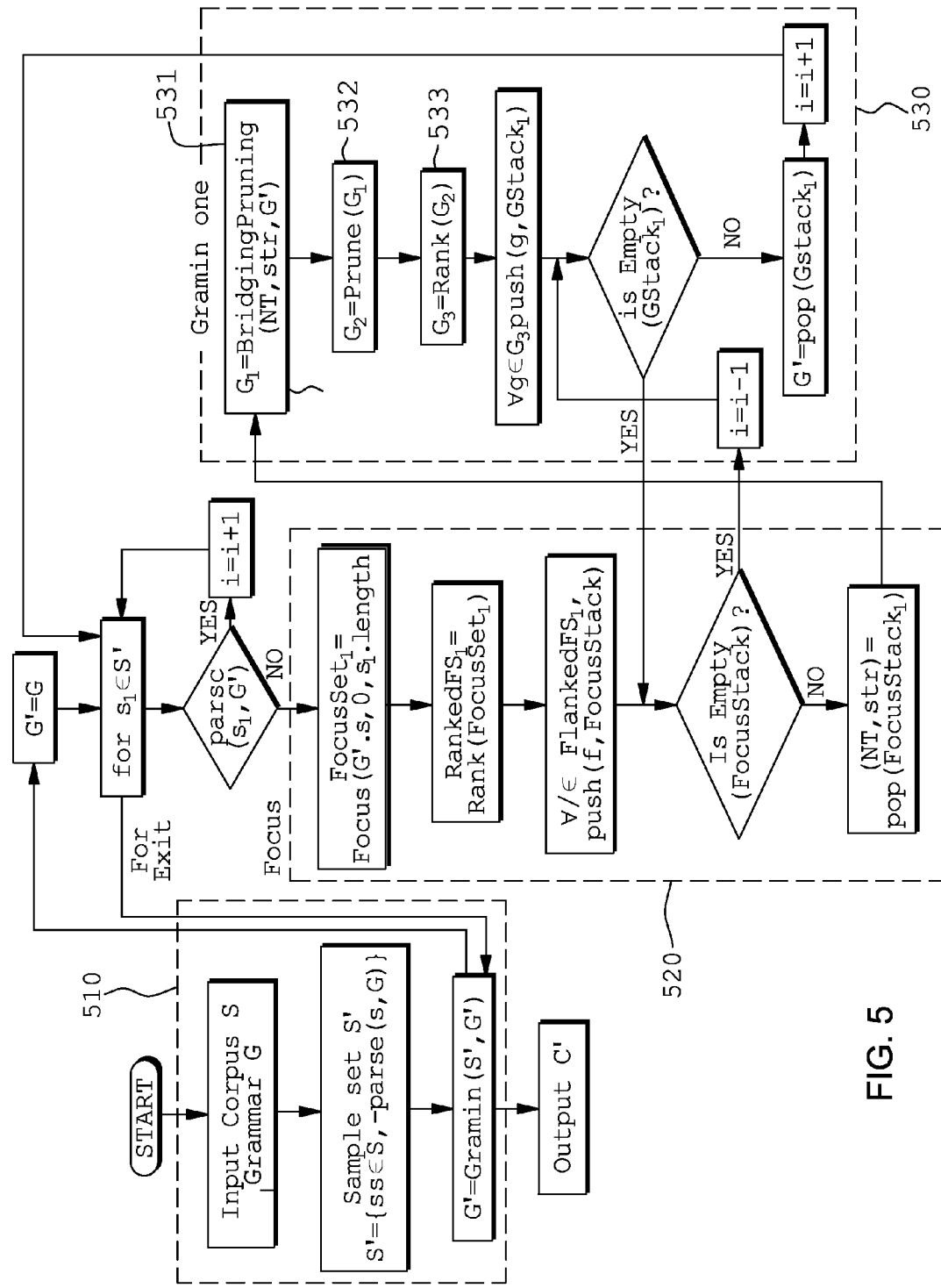
FIG. 5 is a flow diagram illustrating a more detailed framework for the disclosed embodiments.

The disclosed method, system and program storage device embodiments for automatic incremental learning of programming language grammar discussed above are described in greater detail below with reference to specific examples and are hereinafter referred to collectively as "GRAMIN". A detailed framework for the GRAMIN embodiments is illustrated in FIG. 5 and as shown and described below is divided into three major steps referred to herein as "Parse" 510, "Focus" 520 and "Gramin-One" 530.

As background, a context free grammar refers to a 4-tuple $G=(N; T; P; s)$, where N is a finite set of non-terminals, T is a finite set of terminal symbols, P is a set of production rules of the form $p \rightarrow u$, $p \in N$, $u \in (N \cup T)^+$, and s is a starting symbol. Thus, it is written: $w \Rightarrow_G x$ for $w, x \in \in (N \cup T)^+$, if there is a rule $p \rightarrow u \in P$ and string $z_1; z_2 \in (N \cup T)^*$ such that $w = z_1 p z_2$ and $x = z_1 u z_2$. The language of G is the set $L(G) = \{w \in T^+ | s \Rightarrow^*_G w\}$, where the relation $\Rightarrow_G^*$ is the reflexive transitive closure of the $\Rightarrow_G$. Additionally, a non-terminal A can parse/accept a string S, if $A \Rightarrow_G^* S$. Additionally, a non-terminal A can include a string $S_1$ if $A \Rightarrow_G^* S \wedge S_1$ is a substring of S.

Chomsky Normal Form (CNF) rules are rules of the forms A→a and A→QR, where A, Q, R are non-terminals and a is a terminal symbol. The generated rules in the present embodiments are in the form A→β and A→βγ, where (β, γ∈(N∪T)). This form is known as extended CNF (see "Incremental learning of context free grammars by bridging rule generation and search for semi-optimum rule sets" by Katsuhiko Nakamura, ICGI 2006, LNAI 4201, pages 72-83). The feature of extended CNF is that the grammars of this form are simpler than those of CNF. A grammar dependency graph is generated by creating nodes for each non-terminal and terminal symbol. An edge is added from node A to β if there exists a rule A→β, and two edges are added between A to β and A to γ, if there exists a rule A→βγ. Note that an edge A to β added due to A to β A to γ is not distinguished because the aim is to capture any form of dependency between non-terminals. The format of the SORT Statement in ABAP language as available online is shown as: SORT <itab>[<order>] [BY<f1>[<order>] . . . <fn>[<order>]]. This is encoded in the CNF format as shown in FIG. 6.

Furthermore, in Cocke-Younger-Kasami (CYK) parsing, a table (upper triangular matrix) is filled up gradually based on certain rules as shown in FIG. 7. Here, the relation token (Index; TokClass) represents the tokens obtained by lexical analysis, and denotes that TokClass is a class of token obtained at index Index, starting from zero. For examples, given a statement sort t1 by fl., the corresponding token relation is as follows:

---
token(0,SORT). token(1,IDENTIFIER).
token(2,BY). token(3,IDENTIFIER).
token(4,DOT).
---

Tokens [i . . . j] are used to denote string from index i to j - - - 1. The CYK rules, are to be read as, if the antecedents above the bar are true, along with the side condition, then the consequences (below the bar) are derivable/deducible.

The predicate d(Symbol; StartIndex; EndIndex) denotes that cell [StartIndex; EndIndex] of the CYK table has a value Symbol. Here, the symbol is a non-terminal symbol, and signifies that the string of tokens from index StartIndex to (EndIndex−1) can be deduced from rules generated from the Symbol.

The main advantage of CYK parsing is that it generates the parsing table in a completely bottom-up fashion, irrespective of any context. This is particularly useful in the disclosed embodiments for automatic incremental learning of programming language grammar where the context is not available when parsing of sample string goes to an error state.

Parse 510 equates to the processes 102 and 104 in the method of FIG. 1 as performed, for example, by components 301 and 303 of the system of FIG. 3. During the Parse 510 process, the corpus (e.g., a text file of software code for on or more programs is stored in memory) is first broken down into its constituent statements, using a lexer. All the statements are tokenized by the lexer, removing duplicate statements (but keeping the frequency) and put to individual files. This makes the technique disclosed herein semi-automatic, because the technique relies on knowing the end markers of basic and compound statements; however, this is useful especially when the grammars have many types of statements to learn.

For each type of statement, the statement rule is considered for enhancement. All samples of a statement type go through the parsing procedure. Any statements from the corpus that are not parsed constitute the positive sample set to be used in the subsequent steps: Focus 510 and Gramin-One 520.

Focus 520 equates to the process 106 in the method of FIG. 1 as performed, for example, by component 305 of the system of FIG. 3. During Focus 520, for each type of statement, the GRAMIN embodiments employ a learning algorithm on statements from its positive sample set (i.e., on the statements that did not parse, in order of decreasing frequency. Typically, statements which are used most frequently constitute the basic form of statement and statements with lesser frequency are variations to this basic form. Thus, grammar for statements is generated in order of decreasing frequency. However, when frequency information is not available, the statements can be ordered based on number of distinct tokens and their containment relation.

Specifically, during Focus 520, for each statement of the positive sample set (i.e., for each statement that failed to parse) a section of the statement that did not match any of the grammar rules in the set of grammar rules such that the statement could not be parsed is identified along with a subset of the set of grammar rules at fault for the parsing failure. To accomplish this, a focusing algorithm is applied to specifically determine a set of non-terminal and substring pairs referred to herein as the focus non-terminal and focus string, respectively, and collectively called FocusSet such that the reachable (reflexive and transitive) non-terminals of focus non-terminal in the grammar dependency graph can subsequently undergo addition of new grammar rules to parse the substring. The parsing of the substring will result into parsing of the entire string. The focus non-terminals are ordered in terms of the length of the corresponding substring. Focus 520 is described in greater detail below.

Gramin-One 530 equates to the processes 108, 110, 112, 114, 116 and 118 in the method of FIG. 1 as performed, for example, by components 307, 309, 311 and 313 of the system of FIG. 3. That is, during Gramin-One 530, groups of new grammar rules are generated based on the subset of grammar rules determined to be at fault for the parsing failure, the groups of new grammar rules are then (optionally) pruned (531-532 of FIG. 5), (optionally) ranked (and selected for possible incorporation into the set based on certain criteria. Specifically, Gramin-One 530 generates groups of new grammar rules such that each group comprises at least one new grammar rule, such that each group is capable of parsing the statement having the section and such that each new grammar rule comprises a modification of at least one grammar rule in the subset. Gramin-One 530 also (optionally) prunes the groups of new grammar rules based on a set of heuristics, and (optionally) ranks the remaining groups of new grammar rules based on another set of heuristics. Finally, Gramin-One 530 selects one of the groups of new grammar rules (e.g., the highest ranked group of new grammar rules following pruning and ranking) and the rest of the ranked groups of rules are stored as options in case the selected group of new grammar rules is subsequently deemed to be inappropriate. For example, Gramin-One 530 subsequently determines the appropriateness of the selected group of new grammar rules and, if necessary, iteratively performs the selection and appropriateness determination processes until the best group of new grammar rules (e.g., the group of new grammar rules that will provide the greatest amount of parsing coverage) is selected. Gramin-One 530 is described in greater detail below.

Once an appropriate group of new grammar rules is selected, it is merged into the original set of grammar rules and Focus 520 and Gramin-One 530 are repeated for another statement in the sample set that failed to parse. The procedure is complete when every sample for the type of statement is exhausted. In the case where the Gramin-one 530 step fails to generate a new set of grammar rules, it backtracks to the remaining focus pairs. If no more focus pairs are left it backtracks to the last statement and tries to select another pruned result in order of ranking. In case such result set does not exist, backtracking is continued. Note that the FocusStack and GStack are used in FIG. 5 to illustrate backtracking. The search procedure for selecting the new grammar rules is described in greater detail below.

More particularly, as mentioned above, Focus 520 equates to the process 106 in the method of FIG. 1 as performed, for example, by component 305 of the system of FIG. 3. For each positive sample, Focus 520 identifies a sub-set of the set of grammar rules that should have been able to parse the unparsed statement. The overall goal of Focus 520 is to reduce the search space for Gramin-One 530, which as mentioned above generates groups of new grammar rules based on the subset of grammar rules determined to be at fault for the parsing failure, (optionally) prunes the groups of new grammar rules, (optionally) ranks the remaining groups of new grammar rules and selects one of the groups of new grammar rules for possible incorporation into the set of grammar rules based on certain criteria. To accomplish this, Focus 520 is based on the observation that, when a statement is not parsed by the corresponding statement rule, only certain parts of the statement cause the unsuccessful parsing. Focus 520 associates a non-terminal with a substring such that the non-terminal includes the parts. The ultimate reduction in search space of the for Gramin-One 530 is achieved based on three factors: (1) in practice, the number and length of such parts causing the unsuccessful parsing is relatively small, (2) association of an entire part with a non-terminal, and (3) choosing appropriate non-terminals to parse. None of these optimizations introduces the possibility of non-parsing of the sentence; they only give preferences to certain non-terminals for addition of rules over others, as the resultant rules are more programming language grammar like.

An exemplary algorithm that can be use to implement the Focus 520 step is illustrated in FIG. 8. This Focus algorithm is called with the non-terminal for the statement type for which we are trying to complete the rules. For example, to complete the rule for the sort statement the Focus algorithm is called as Focus(sort_statement; 0; L), where zero is the index of the first token of the unparsed statement, and L is the number of tokens generated from the unparsed statement.

In the case 1 as shown in FIG. 8, if A already accepts a part of the input string, making two disjoint parts which still need to be included, Focus 520 selects the non-terminal A to accept the string, and does not try to create other non-terminals to accept the disjoint strings. If case 1 is not satisfied, case 2 is considered. In case 2, the rules of the form A BC are considered. In subcase 2.I, the non-terminal B and C parses two parts of the input string. The remaining part (the string from index J to J+P, say $S_p$) of the string is not parsed by either B or C. In this case, it is derived that either the rules of B or the rules of C can be augmented to include rules such that the unparsed part of the string can be parsed. If either of them includes the $S_p$, A can parse the entire string. Note that here the following possibilities are eliminated: (1) that the rules of A can be changed (like A→B D; D→$R_s$ C; $R_s$⇒ $_GS_p$) to include without changing the rules of B and C, and (2) that B and C together includes $S_p$. The first elimination is based on the fact that this elimination will only cause in the reduction in readability of semantic association of names of non-terminals, as new rules can be added to the rules of B to parse $R_s$. The second elimination is based on the observation that the $R_p$ is typically another clause or option associated with either B or C, but not both. The Focus algorithm fails to focus (returns with the called set an answer set) for the terminals.

In sub-case 2.II, the non-terminal B accepts the left part of the string, and C does not accept any suffix. In that case, it is preferred that C accepts the remaining part as it is supposed to accept a string on right side of B, eliminating the possibility of including the remaining part by B. However, when C is optional (expressed using condition: if 9ɘ (A; I; Jmax)), then the both B and C can accept the remaining part. The Case III, is similar to case II.

Furthermore, consider the example below of an unparsed string for the sort_statement rule presented above.

SORT t1[ ] BY f1, which is tokenized as below:

--- token(0,SORT). token(1,IDENTIFIER).
token(2,LBRACKET). token(3,RBRACKET).
token(4,BY). token(5,IDENTIFIER).
token(6,DOT).

---

Note that itab rule says that itab (internal table) can be only an identifier, whereas in this example, the itab is represented by three tokens representing string t1[ ]. The illustration for this example is shown in FIG. 9. As a result of Focus 520, three results are obtained: (itab, 1, 4), (C, 2, 6), and (sort_option, 2, 4).

Additionally, a modification can be made to the above-described algorithm for Focus 520 based on the following observation: If all the non-empty strings accepted by a non-terminal can start (end) with only one keyword, then it is highly unlikely that the rule will be changed to accept a string which do not start (end) with the keyword.

Many examples of this observation exist, for example, for, while statements start with for and while keywords, respectively. As for the ending symbol, every statement ends with a single delimiter symbol. In the language we are considering the statement delimiter symbol is DOT. Consider the SQL statement select, select can have many clauses viz. where, group-by, order-by, into and many uncommon ones like having, appending, hints. All such clauses start with a specific keyword, and therefore non-terminals describing such keywords are not likely to change the rules that can affect their start.

In this example, the clause that starts with 'BY' is not likely to change its starting symbol. As a result, (C, 2, 6) can be eliminated from the result set of the Focus algorithm and the new observation can be implemented as follows. Define a predicate prop/3 (predicate/arity) with each non-terminal, where prop(N, S, E) denotes that the all non-empty string accepted by the non-terminal can start with a fixed terminal symbol (when S=f) or not (when S=v), f and v stands for fixed and variable, respectively. The value of E (either f or v), denotes the state of the end terminal symbol. The prop/3 can be determined by analyzing the rules. In case the start or end is constant, the constant symbol can be obtained using start_kw or end_kw functions. In the example, prop(D, f v), and prop(C, v, v) are true. Case I of the Focus algorithm is changed as shown in FIG. 10.

The results obtained by the Focus algorithm is sorted based on their lengths. The focus pair which has minimal length is first considered for the Gramin-One 530, as that would result in lesser grammar search. In case there is a tie in length, the non-terminal which is closed to leaf in grammar dependency graph is considered first. Thus, the Focus 520 algorithm can also be seen as a novel error recovery technique on top of CYK parsing, and includes an observation on PL grammars as heuristic to further localize the search space.

Also as mentioned above, Gramin-One 530 equates to the processes 108, 110, 112, 114, 116 and 118 in the method of FIG. 1 as performed, for example, by components 307, 309, 311 and 313 of the system of FIG. 3. Specifically, during Gramin-One 530 bridging rules can be used to generate the groups of new grammar rules (i.e., CNF rules) to parse an unparsed string of a statement (see items 531-532 of FIG. 5). Exemplary bridging rules 1-8 are presented in FIG. 11. As shown, each bridging rule has three parts, wherein the consequent (below the line) can be derived from the antecedents (above the line) and the side condition (right side of the line). The expression $i^A k$ defines a relation called bridge, and denotes that the substring token[i . . . k] can be parsed using the rules of non-terminal A (or in other words string generated from non-terminal A will contain the string token[i . . . k]). Note that the predicate d/3 denotes the CYK table, which is derived using only the initial set of rules, whereas derivation of bridge uses newly derived rules. The relation d/3 is computed before calling the Gramin-One 530 procedure and is not changed during the Gramin-One 530 procedure. Thus, the precondition of the rule on relation d/3 occurs as side condition, whereas rules and bridge relation occur as antecedents of the rules, as both the relations are changing.

The first rule generates a new rule A→βγ, and bridges tokens[i . . . k], if β and γ have individually parsed the left and right parts of the string. The rule evaluation itself can be done either as bottom-up or top-down. Gramin-One 530 employs a top-down strategy for evaluating these rules, in that case, A can be bound in the generated rule, if it is bound in the call bridge/3. The second rule resembles with the second rule of CYK parsing in FIG. 7. The 3rd, 4th, and 7th rules are very similar, if there exist a rule A→QR, where Q and R bridges using new rules or derived using previous rules two halves of a string, then the string itself is bridged by A. The 1st, 5th, 6th and 8th rules deduce the rule A→QR to bridge a string, if the Q and R accepts (by bridging/deriving) two halves of the string. The 5th, 6th and 8$^{th}$ rules are rule generation forms of the 3th, 4th and 7th rules, respectively.

Bridging rules are sufficient to derive extended CNF rules that can parse a given string. However, the number of possible rule sets derived from the bridging rules, where each rule set along with the initial rules can derive the sample string, can be exceedingly large. In practice, only few of those possible rule sets can be considered as good rules. Only those rules will sustain through the Gramin-One 530 procedure and will not be discarded by pruning.

The aim of the Gramin-One 530 procedure is to produce such rules which are good, based on common PL language rules. Gramin-One 530 procedure imposes such goodness criteria to generate good rules or prune rules that are not good, or rank rules based on preference. In other words, pruning and bridging are related. Some strategies are implemented by Gramin-One 530 as conditions to each bridging rule, if the condition is not satisfied, then the consequent is not included in the bridge relation and new rules are not generated (wherever applicable).

Additionally, Gramin-One 530 uses a grammar dependency graph to restrict the domain of unbound non-terminals in bridging rules. For example, if A→Q R is generated using the second bridging rule, where Q recognizes an identifier. In typical programming language grammar many non-terminals will parse an identifier. The domain of Q is therefore large, and so is the domain of QR which is the cross product of domain of Q and R. The use of this rule restricts the domain of Q to all the non-terminals which is either reachable from the non-terminal A in the grammar dependency structure or a freshly generated non-terminal. Typical PL grammar rules are not expressed with a minimum number of non-terminals. In practice, non-terminals which accept same string are given different names in the grammar to represent different semantic entities. Using this pruning strategy, the semantic dependencies are maintained by preserving the same dependency structure in original grammar, as illustrated in the example below.

For input string 'SORT (t1) BY f1.', some of the rule sets generated by bridging rule are given below:

{itab → X RPAREN , X → LPAREN sort_by__item} X
{itab → X RPAREN , X → LPAREN itab}
{itab → X RPAREN , X → LPAREN sort_by__item_field} X
{itab → X RPAREN , X → LPAREN sort_clause} X
{itab → X RPAREN , X → LPAREN identifier}
{itab → X RPAREN , X → LPAREN E} X
{itab → X RPAREN , X → LPAREN IDENTIFIER}

In this case, as itab, identifier and any new non-terminal are reachable from the non-terminal itab in the grammar dependency graph. Gramin-One 530 removes the cross (X) marked rule sets from the generated rule set.

Gramin-One 530 further allows for Or-ing of similar types. That is, Gramin-One 530 checks the rules generated by bridging of the form A→Q, where there already exists a rule of the form A→R. In this case the types of Q and R should be compatible. For example, for input string 'SORT t1 BY f1 STABLE.', the bridging rule generates the following rule sets:

{sort_by__item_field → STABLE}X
{sort _by__item_field → identifier STABLE}

Initially sort_by_item_field was defined as sort_by_item_field→identifier. As the intention of the grammar is to represent sort_by_item_field by an identifier, Gramin-One 530 does not Or it with a keyword. Instead Gramin-One 530 only permits to extend identifier by Or-ing identifier with a LITERAL-ID, or certain predefined set of keywords used as an identifier. In general, it is possible to infer the non-terminals with the same type based on an analysis of the dependency graph.

For the same reason, Gramin-One 530 discards the following rule sets:

{sort_option → D STABLE}
{sort_option → B STABLE}

Specifically, certain non-terminals are semantically equivalent to terminals. For example, the non-terminals identifier, end_of_statement typically do not undergo changes. Therefore, these non-terminals are omitted from the domain of LHS of a newly generated rule, as illustrated in the example below.

Consider the input 'SORT t1 BY f1 STABLE.' to the Gramin-One 530 algorithm. The Focus 520 algorithm limits the scope of search to (A, 0, 5). Bridging rule generates the answer E→STABLE along with other answers. The answer is valid as E will accept the string f1 STABLE. However, as E serves the purpose of expressing sort_by_item+, introducing E→STABLE will accept the string STABLE+by E, which is likely to be incorrect. Removing E from LHS of the generated rule will prune 12 other rules generated by bridging rules. Also the bridging rule generates the answers where identifier is in the LHS of the rule, e.g. identifier→STABLE, which are also ruled out by Gramin-One.

The solution is found in pruning and/ranking. That is, the following strategies are used to prune and/or rank rule sets (see processes Prune($G_1$) 532 and Rank($G_2$) 533 in FIG. 5) generated by the bridging rules.

For example, the programming language grammar maintains an invariant that every open structure should have its corresponding closed structure maintaining proper nesting. Following this, the newly introduced rule along with the initial rules should generate matching parenthesis. The similar rules are applicable for braces and brackets. Thus, Gramin-One 530 can follow a heuristic that prunes any newly generated rules that do not have matching parentheses, braces and/or brackets can be pruned.

Additionally, the bridging rules can generate different sets of solution which are semantically equivalent. Three different forms of recursion left, right, double can be used to express the repetition. Gramin-One 530 can follow a heuristic that allows only right recursive rules and prunes the two forms of recursion when the right recursive form is present.

Additionally, in order to get a small grammar rule, Gramin-One can follow heuristics for pruning and/or ranking that are based on the cardinality of each set. That is, the set which has over a given number of production rules or non-terminals can be pruned. Additionally or alternatively, the set which has less production rules or non-terminals can be preferred during ranking over others.

Additionally, bridging rules can present a set of rules which may be the superset of an already produced set. Gramin-One 530 can have a heuristic that the requires consideration of only those rules whose subset rule set has not yet been generated by Gramin-One 530, as illustrated in the example below.

Consider the following two rule sets generated by bridging rules. Input: SORT t1 by f1 STABLE.

{A → A STABLE}
{A → ASTABLE, sort_clause → X itab, X → IDENTIFIERby}

In this case, the second rule set would be pruned out because the subset rule set has already been generated by Gramin-One 530.

Furthermore, if more than one similar structures appear consecutively, then a rule should be generated representing the repetition and introduction of recursion of non-similar entities or recursion having no base case to terminate should be avoided. Specifically, programming syntax is repetitive in nature, and use of recursion is very common in PL grammars. Gramin-One 530 can use this observation to generate new rules that are recursive in nature, rather than rules having finite number of consecutive structures. For example, instead of generating a rule A→identifier identifier, Gramin-One 530 can give preference to A→X, A→XA, X→identifier. In fact, the grammar obtained by a repetition/recursion rule is preferred over other grammars. The use of delimiters like comma is very common in denoting such repetitive syntax. Thus, the following rule is included in the set of bridging rules.

$$\frac{A \to \beta}{A \to X, A \to XA, X \to \beta, i \stackrel{A}{\to} k} d(A, i, j), d(\beta, i, j)d(\beta, j, k)$$

In the following example, Gramin-One 530 avoids generating unintended recursion rules. For the input 'SORT t1 BY f1 STABLE.' the bridging rules are going to generate the following rule set: {A→A STABLE} to include the keyword STABLE at the end of the string accepted by A. However, this introduces an unintended recursion, which is pruned.

As mentioned above, bridging rules can be used to generate rules which along with initial input samples accept one positive sample statement. Typically many such rule sets can be generated to accept one sample statement. Gramin-One 530 then uses heuristics based strategy to prune rule sets and order one rule set over another. However, generating all possible rule sets and subsequently applying all heuristics to get the best possible solution is not always feasible, as all possible rule sets may not fit into memory. Note that the bridging rule do not always produce rule set in order of preference, even though certain preference is imposed by ordering the set of bridging rules.

In this scenario, Gramin-One 530 can employ a search strategy where it uses Gramin-One 530 rules to obtain a predefined number of rule sets. Then, it can employ the goodness criteria to find the best solution among those rule sets, and keeps the other solutions in store. The chosen solution is then added to the set of rules, and the resultant set of rules is used as input to generate rules for next sample statement. When this process fails to generate a rule set for a statement, the process backtracks to the last statement, generates a single solution using bridging rules (if possible), and adds the solution to the already existing solution set in store. Finally, it computes the best of the solution set and goes forward with the best solution set.

It should further be understood that the terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of at least one other feature, integer, step, operation, element, component, and/or groups thereof. The corresponding structures, materials, acts, and equivalents of all means or step plus function elements in the claims below are intended to include any structure, material, or act for performing the function in combination with other claimed elements as specifically claimed. The description of the disclosed embodiments has been presented for purposes of illustration and description, but is not intended to be exhaustive or limiting in the form disclosed. Many modifications and variations will be apparent to those of ordinary skill in the art without departing from the scope and spirit disclosed embodiments.

Therefore, disclosed above are embodiments of a computer-implemented method for automatic incremental learning of programming language grammar. In the method, a corpus (e.g., a text file of software code) that is written in a particular programming language can be parsed based on a set of grammar rules for that particular programming language. Next, an unparsed statement within the corpus can be identified along with a section thereof, which did not match any of the grammar rules in the set of grammar rules. Then, a subset of the set of grammar rules at fault for the parsing failure can be identified. Once the subset of grammar rules at fault for the parsing failure are identified, groups of new grammar rules can be developed such that each group comprises at least one new grammar rule, such that each group is further capable of parsing that statement with that section, and such that each new grammar rule is a modification of at least one grammar rule in the subset. Once the groups of new grammar rules are developed, one specific group can be selected for possible incorporation into the set of grammar rules in order to produce a new set of grammar rules. Optionally, before a specific group is selected, the groups of new grammar rules can be heuristically pruned and/or ranked in order to ensure that the best group is selected. Also disclosed are embodiments of an associated system and program storage device.

What is claimed is:

1. A method comprising:
    parsing, by a computer, a corpus based on a set of grammar rules;
    identifying, by said computer and following said parsing of said corpus, a statement in said corpus that was not parsed, a section of said statement that did not match any of said grammar rules in said set of grammar rules such that said statement could not be parsed, and a subset of said set of grammar rules at fault;
    developing, by said computer, groups of new grammar rules such that each group comprises at least one new grammar rule, such that each group is developed for parsing said statement having said section, and such that each new grammar rule is a modification of a grammar rule in said subset;
    selecting, by said computer, a single group of said groups of new grammar rules for possible incorporation into said set of grammar rules to produce a new set of grammar rules; and,
    performing, by said computer, additional processes in order to determine whether to incorporate said single group into said new set.

2. The method of claim 1, said performing of said additional processes comprising:
    identifying, by said computer, a second statement in said corpus that was not parsed and a second section of said second statement that did not match any of said grammar rules in said set of grammar rules such that said second statement could not be parsed;
    determining, by said computer, whether said single group is capable of parsing said second statement;
    when said single group is determine to be capable of parsing said second statement, iteratively repeating, by said computer, said identifying and said determining for other statements in said corpus that were not parsed; and,
    when said single group is determined to be capable of parsing said other statements, incorporating, by said computer, said single group into said new set.

3. The method of claim 2, when said single group is determined to be not capable of parsing said second statement, said method further comprising,
    selecting, by said computer, a different group of said groups of new grammar rules for possible incorporation into said set of grammar rules to produce said new set of grammar rules; and,
    determining, by said computer, whether said different group is capable of parsing said second statement.

4. The method of claim 1, further comprising, before said selecting, ranking, by said computer, said groups of new grammar rules, said ranking being based on a set of heuristics and said selecting being based on said ranking.

5. The method of claim 4, said set of heuristics being based on at least one of the following:
    total number of grammar rules in each group;
    number of non-terminals within said new grammar rules of each group;
    sizes of right-hand sides of said new grammar rules of each group;
    inclusion of recursive constructs in said new grammar rules of each group; and
    coverage of other statements by said new grammar rules of each group.

6. The method of claim 1, further comprising:
    generating, by said computer and based on said set of grammar rules, a parser program for performing said parsing; and
    revising, by said computer, said parser program based on said new set of grammar rules.

7. A system comprising:
    at least one memory device storing a corpus and a parser program generated based on a set of grammar rules; and,
    at least one processor in communication with said memory device and comprising:
        a parser executing said parsing program to parse said corpus;
        a grammar rule analyzer identifying a statement in said corpus that was not parsed by said parser, a section of said statement that did not match any of said grammar rules in said set of grammar rules such that said statement could not be parsed, and a subset of said set of grammar rules at fault;
        a grammar rules generator developing groups of new grammar rules such that each group comprises at least one new grammar rule, such that each group is developed for parsing said statement having said section, and such that each new grammar rule is a modification of a grammar rule in said subset; and,
        a grammar rule selector selecting a single group of said groups of new grammar rules for possible incorporation into said set of grammar rules to produce a new set of grammar rules,
        said grammar rule analyzer and said grammar rules generator further performing additional processes in order to determine whether to incorporate said single group into said new set.

8. The system of claim 7,
    said grammar rule analyzer and said grammar rules generator performing said additional processes comprising:
        said grammar rule analyzer further identifying a second statement in said corpus that was not parsed and a second section of said second statement that did not match any of said grammar rules in said set of grammar rules such that said second statement could not be parsed; and,
        said grammar rules generator further determining whether said single group is capable of parsing said second statement,
        said grammar rule analyzer and said grammar rules generator further iteratively repeating said identifying and said determining, respectively, for other statements in said corpus that were not parsed, when said single group is determined to be capable of parsing said second statement, and said grammar rule selector incorporating said single group into said new set, when said single group is determined to be capable of parsing said other statements.

9. The system of claim 8,
said grammar rule selector further selecting a different group of said groups of new grammar rules for possible incorporation into said set of grammar rules to produce said new set of grammar rules, when said single group is determined to be not capable of parsing said second statement, and
said grammar rules generator further determining whether said different group is capable of parsing said second statement.

10. The system of claim 7, said at least one processor further comprising a grammar rules ranking generator, said grammar rules ranking generator ranking said groups of new grammar rules based on a set of heuristics and, after said ranking, said grammar rule selector selecting said single group based on said ranking.

11. The system of claim 10, said set of heuristics being based on at least one of the following:
total number of grammar rules in each group;
number of non-terminals within said new grammar rules of each group;
sizes of right-hand sides of said new grammar rules of each group;
inclusion of recursive constructs in said new grammar rules of each group; and
coverage of other statements by said new grammar rules of each group.

12. The system of claim 7, said at least one processor further comprising a parser program generator, said parser program generator generating a parser program for performing said parsing based on said set of grammar rules and revising said parser program based on said new set of grammar rules.

13. A method comprising:
parsing, by a computer, a corpus based on a set of grammar rules;
identifying, by said computer and following said parsing of said corpus, a statement in said corpus that was not parsed, a section of said statement that did not match any of said grammar rules in said set of grammar rules such that said statement could not be parsed, and a subset of said set of grammar rules at fault;
developing, by said computer, groups of new grammar rules such that each group comprises at least one new grammar rule, such that each group is developed for parsing said statement having said section, and such that each new grammar rule is a modification of a grammar rule in said subset of said set of grammar rules;
automatically discarding, by said computer any identified groups of said groups of new grammar rules that fail to meet pre-established criteria, said automatically discarding being performed by said computer using a first set of heuristics;
after said automatically discarding, ranking, by said computer and based on a second set of heuristics, any remaining groups of said groups of new grammar rules;
selecting, by said computer and based on said ranking, a single group of said remaining groups for possible incorporation into said set of grammar rules to produce a new set of grammar rules; and,
performing, by said computer, additional processes to determine whether to incorporate said single group into said new set.

14. The method of claim 13, said performing of said additional processes comprising:
identifying, by said computer, a second statement in said corpus that was not parsed and a second section of said second statement that did not match any of said grammar rules in said set of grammar rules such that said second statement could not be parsed;
determining, by said computer, whether said single group is capable of parsing said second statement;
when said single group is determine to be capable of parsing said second statement, iteratively repeating, by said computer, said identifying and said determining for other statements in said corpus that were not parsed; and,
when said single group is determined to be capable of parsing said other statements, incorporating, by said computer, said single group into said new set.

15. The method of claim 14, when said single group is determined to be not capable of parsing said second statement, said method further comprising,
selecting, by said computer, a different group of said remaining groups of new grammar rules for possible incorporation into said set of grammar rules to produce said new set of grammar rules; and
determining, by said computer, whether said different group is capable of parsing said second statement.

16. The method of claim 13, said first set of heuristics being based on at least one of the following:
occurrence of a non-matching parenthesis;
recursion form; and
subset configuration.

17. The method of claim 13, said second set of heuristics being based on at least one of the following:
total number of said new grammar rules in each remaining group;
number of non-terminals within said new grammar rules of each remaining group;
sizes of right-hand sides of said new grammar rules of each remaining group;
inclusion of recursive constructs in said new grammar rules of each remaining group; and
coverage of other statements by said new grammar rules of each remaining group.

18. The method of claim 13, further comprising:
generating, by said computer and based on said set of grammar rules, a parser program for performing said parsing; and
revising, by said computer, said parser program based on said new set of grammar rules.

19. A system comprising:
at least one memory device storing a corpus and a parser program generated based on a set of grammar rules; and
at least one processor in communication with said memory device and comprising:
a parser executing said parsing program to parse said corpus;
a grammar rule analyzer identifying, following said parsing of said corpus, a statement in said corpus that was not parsed, a section of said statement that did not match any of said grammar rules in said set of grammar rules such that said statement could not be parsed, and a subset of said set of grammar rules at fault;
a grammar rules generator developing groups of new grammar rules such that each group comprises at least one new grammar rule, such that each group is developed for parsing said statement having said section, and such that each new grammar rule is a modification of a grammar rule in said subset of said set of grammar rules;
a grammar rules pruner automatically discarding any identified groups of said groups of new grammar rules that fail to meet pre-established criteria, said automatically discarding being performed by said grammar rules pruner using a first set of heuristics;
a grammar rules ranking generator ranking any remaining groups of said groups of new grammar rules after said automatically discarding, said ranking being performed by said grammar rules ranking generator based on a second set of heuristics; and
a grammar rule selector selecting, based on said ranking, a single group of said any remaining groups for possible incorporation into said set of grammar rules to produce a new set of grammar rules,
said grammar rule analyzer and said grammar rules generator further performing additional processes in order to determine whether to incorporate said single group into said new set.

20. The system of claim 19,
said grammar rule analyzer and said grammar rules generator performing said additional rocesses comprising:
said grammar rule analyzer further identifying a second statement in said corpus that was not parsed and a second section of said second statement that did not match any of said grammar rules in said set of grammar rules such that said second statement could not be parsed, and
said grammar rules generator further determining whether said single group is capable of parsing said second statement,
said grammar rule analyzer and said grammar rules generator further iteratively repeating said identifying and said determining, respectively, for other statements in said corpus that were not parsed, when said single group is determined to be capable of parsing said second statement, and
said grammar rule selector incorporating said single group into said new set, when said single group is determined to be capable of parsing said other statements.

21. The system of claim 20,
said grammar rule selector further selecting a different group of said any remaining groups for possible incorporation into said set of grammar rules to produce said new set of grammar rules, when said single group is determined to be not capable of parsing said second statement, and
said grammar rules generator further determining whether said different group is capable of parsing said second statement.

22. The system of claim 19, said first set of heuristics being based on at least one of the following:
occurrence of a non-matching parenthesis;
recursion form; and
subset configuration.

23. The system of claim 19, said second set of heuristics being based on at least one of the following:
total number of said new grammar rules in each remaining group;
number of non-terminals within said new grammar rules of each remaining group;
sizes of right-hand sides of said new grammar rules of each remaining group;
inclusion of recursive constructs in said new grammar rules of each remaining group; and
coverage of other statements by said new grammar rules of each remaining group.

24. The system of claim 19, said at least one processor further comprising a parser generator, said parser generator generating a parser program for performing said parsing, based on said set of grammar rules and revising said parser program based on said new set of grammar rules.

25. A non-transitory program storage device readable by a computer and tangibly embodying a program of instructions executable by said computer to perform a method, said method comprising:
parsing a corpus based on a set of grammar rules;
following said parsing of said corpus, identifying a statement in said corpus that was not parsed, a section of said statement that did not match any of said grammar rules in said set of grammar rules such that said statement could not be parsed, and a subset of said set of grammar rules at fault;
developing groups of new grammar rules such that each group comprises at least one new grammar rule, such that each group is developed for parsing said statement having said section, and such that each new grammar rule is a modification of a grammar rule in said subset of said set of grammar rules;
selecting a single group of said groups of new grammar rules for possible incorporation into said set of grammar rules to produce a new set of grammar rules; and,
performing additional processes to determine whether to incorporate said single group into said new set.

* * * * *